United States Patent
Klode et al.

(10) Patent No.: US 9,929,627 B2
(45) Date of Patent: Mar. 27, 2018

(54) BRUSHLESS MOTOR WITH MODULAR POSITION SENSOR

(71) Applicant: GOODRICH CORPORATION, Charlotte, NC (US)

(72) Inventors: Harald Klode, Centerville, OH (US); David Drennen, Bellbrook, OH (US); Kevin Rehfus, Troy, OH (US); Albert Keith Pant, Carlisle, OH (US); Robert French, Beavercreek, OH (US)

(73) Assignee: Goodrich Corporation, Charlotte, NC (US)

( * ) Notice: Subject to any disclaimer, the term of this patent is extended or adjusted under 35 U.S.C. 154(b) by 261 days.

(21) Appl. No.: 14/531,400

(22) Filed: Nov. 3, 2014

(65) Prior Publication Data
US 2016/0126811 A1 May 5, 2016

(51) Int. Cl.
| | |
|---|---|
| *H02K 11/00* | (2016.01) |
| *H02K 19/02* | (2006.01) |
| *H02K 5/04* | (2006.01) |
| *H02K 1/12* | (2006.01) |
| *H02K 15/00* | (2006.01) |
| *H02K 11/215* | (2016.01) |

(52) U.S. Cl.
CPC .......... *H02K 11/0021* (2013.01); *H02K 1/12* (2013.01); *H02K 5/04* (2013.01); *H02K 11/215* (2016.01); *H02K 15/00* (2013.01); *H02K 19/02* (2013.01); *H02K 2213/12* (2013.01)

(58) Field of Classification Search
CPC ................... H02K 11/215; H02K 11/00–11/40
USPC ....................................... 310/68 B
See application file for complete search history.

(56) References Cited

U.S. PATENT DOCUMENTS

| | | | | |
|---|---|---|---|---|
| 7,057,317 | B2* | 6/2006 | Kuwert | H02K 3/50 310/68 B |
| 2005/0082926 | A1 | 4/2005 | Grzywacz et al. | |
| 2005/0184606 | A1* | 8/2005 | Kokubu | H02K 5/148 310/75 R |
| 2007/0178723 | A1* | 8/2007 | Kataoka | H02K 3/50 439/76.2 |
| 2009/0309441 | A1* | 12/2009 | Yang | H02K 29/08 310/91 |
| 2012/0160596 | A1 | 6/2012 | Yamasaki | |

FOREIGN PATENT DOCUMENTS

| | | |
|---|---|---|
| EP | 1003270 | 5/2000 |
| EP | 1372241 | 12/2003 |
| EP | 2905876 | 8/2015 |
| FR | 2917476 | 12/2008 |
| WO | 2014054098 | 4/2014 |

OTHER PUBLICATIONS

Extended European Search Report dated Apr. 28, 2016 in European Application No. 15192651.6.

* cited by examiner

*Primary Examiner* — Thomas Truong
(74) *Attorney, Agent, or Firm* — Snell & Wilmer L.L.P.

(57) ABSTRACT

A brushless DC motor is provided. The brushless DC motor comprises a motor housing around an axis, a stator assembly inside the motor housing, a carrier plate fixed relative to the stator assembly, and a Hall effect sensor assembly removably coupled to the carrier plate. A method of making a brushless DC motor is also provided comprising fixing a carrier plate relative to a stator assembly of a brushless DC motor assembly, and fixing a first Hall effect sensor array to the carrier plate.

14 Claims, 4 Drawing Sheets

BRUSHLESS MOTOR WITH MODULAR POSITION SENSOR

FIELD OF INVENTION

The present disclosure relates to a brushless DC motor, and, more specifically, to a modular Hall effect sensor array for a brushless DC motor.

BACKGROUND OF THE INVENTION

A brushless DC (BLDC) motor is one of the major components of an electro-mechanical actuator (EMA) for aircraft electric braking systems. The motor is used to drive a gear system, which in turn actuates a ball screw assembly that produces the EMA's output force. BLDC motor operation may rely on the availability of a motor shaft position feedback signal to provide the motor controller with necessary angular shaft position information for motor commutation.

Typical technologies used for generating this angular feedback information may include resolvers, optical encoders and magnetic Hall effect sensors. In order to achieve high motor performance and reliability, Hall effect sensors (typically three individual sensor modules arranged under a specific angle) may be adjusted angularly during motor assembly and, after they have been adjusted, permanently potted or overmolded to the motor assembly to resist mechanical shock, vibration, and contamination. As a result, these Hall effect sensors are not individually replaceable in the event of failure and thus the entire motor may be scrapped if a Hall effect sensor fails.

SUMMARY OF THE INVENTION

A brushless DC motor is provided. The brushless DC motor comprises a motor housing around an axis, a stator assembly inside the motor housing, a carrier plate fixed relative to the stator assembly, and a Hall effect sensor assembly removably coupled to the carrier plate.

In various embodiments, a motor end frame assembly may be configured to axially fix the Hall effect sensor assembly. A plurality of Hall effect sensor modules may be fixedly coupled to the Hall effect sensor assembly. The motor housing may include a shoulder to axially locate the carrier plate. The stator assembly may include an overmolding with a tapered surface. The tapered surface may radially locate the Hall effect sensor assembly. The Hall effect sensor assembly may include a tab to angularly locate the Hall effect sensor assembly. The carrier plate may have a groove configured to receive the tab. The Hall effect sensor assembly may be fixed relative to the carrier by a first fastening mechanism. The carrier can also be fixed relative to the stator assembly by a second fastening mechanism. A motor shaft assembly extends through the carrier plate and Hall effect sensor assembly. The motor shaft assembly may rotate on the axis. A trigger magnet may be fixed relative to the motor shaft assembly. The trigger magnet passes within half a millimeter of a Hall effect sensor module coupled to the hall effect sensor assembly in response to a rotation of the motor shaft assembly.

A method of making a brushless DC motor is provided comprising fixing a carrier plate relative to a stator assembly of a brushless DC motor assembly, and fixing a first Hall effect sensor array to the carrier plate.

In various embodiments, the method may further comprise the step of aligning the carrier plate relative to the stator assembly with the first Hall effect sensor array fixed relative to the carrier plate. The method may also include removing the Hall effect sensor array from the carrier plate and fixing a second Hall effect sensor array to the carrier plate.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, the term "distal" refers to the direction radially outward, or generally, away from the axis of rotation of a rotor in a brushless DC (BLDC) motor. As used herein, "proximal" refers to a direction radially inward, or generally, towards the axis of rotation of a BLDC motor.

The electric motor with a modular position sensor described herein enables the modular (i.e., individual) replacement of a Hall effect sensor array in the event of a failed sensor while maintaining Hall effect sensor array alignment, durability and reliability. The modular position sensor may be installed with the Hall effect sensors pre-aligned in the modular casing. Thus, the electric motor with a modular position sensor enables fast and easy replacement without recalibration. Electric motors employing the modular position sensor described herein may be repaired rather than discarded in the event of a Hall effect sensor failure. In that regard, the modular positioning sensor may save the cost and time associated with replacing and recalibrating a brushless motor having a failed Hall effect sensor.

Figure 1A:
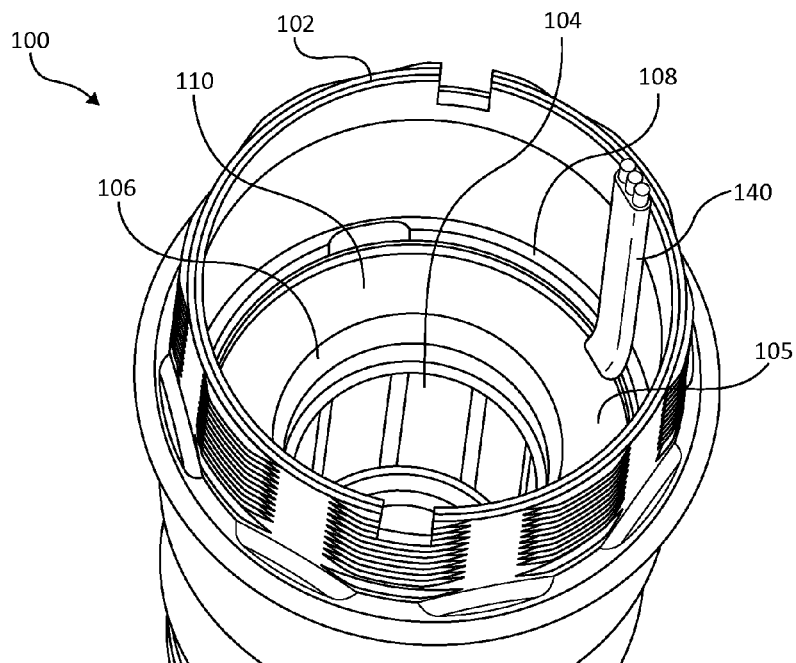
FIG. 1A illustrates a partially assembled brushless DC motor including a stator assembly, in accordance with various embodiments.
Figure 1B:
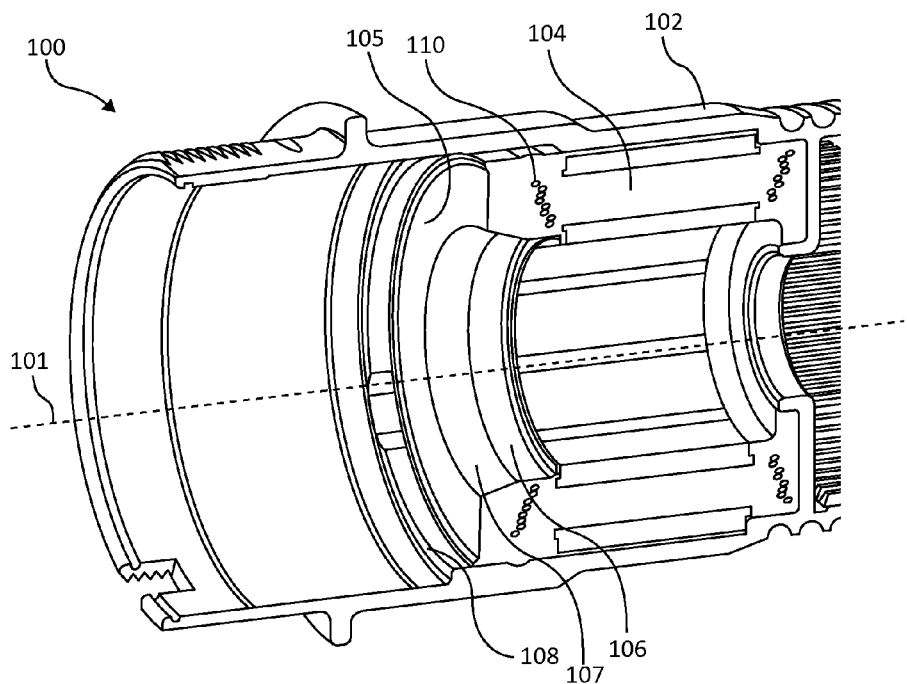
FIG. 1B illustrates a partial cross section of a partially assembled brushless DC motor including a stator assembly, in accordance with various embodiments.

With reference to FIGS. 1A and 1B, a BLDC motor 100 is shown in a partially assembled state with an overmolded stator assembly. BLDC motor 100 includes motor housing 102 disposed around axis 101. An internal bore of motor housing 102 contains a stator assembly 104 having an annular shape and windings 110 encapsulated by an overmolding 105. A radial surface of overmolding 105 is adjacent shoulder 108 of motor housing 102 that serves as a radial locator for a later installed carrier and Hall effect sensor assembly (HSA). Shoulder 108 may be an internal step in motor housing 102. A radial locating feature 106 comprises a tapered surface 107 and a flat surface defined by an inner bore of overmolding 105, both relative to axis 101, to radially locate a later installed HSA.

Figure 2A:
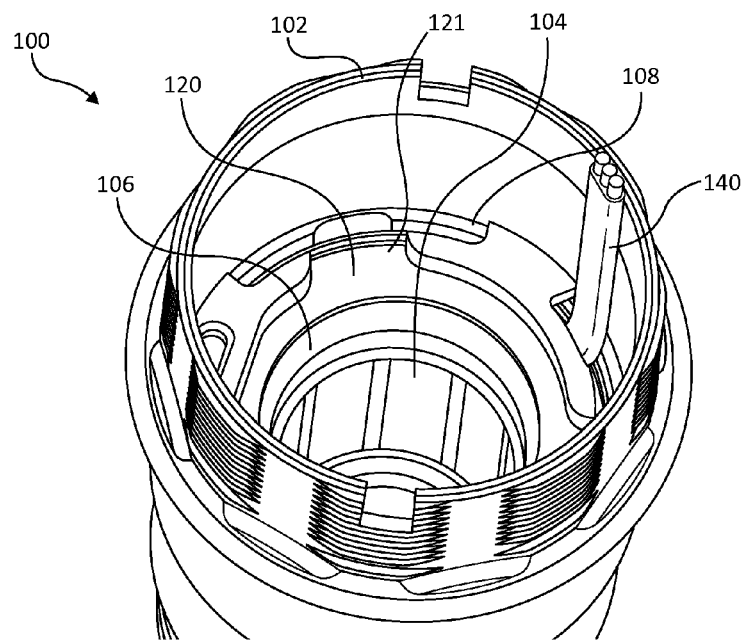
FIG. 2A illustrates a partially assembled brushless DC motor including a carrier plate, in accordance with various embodiments.
Figure 2B:
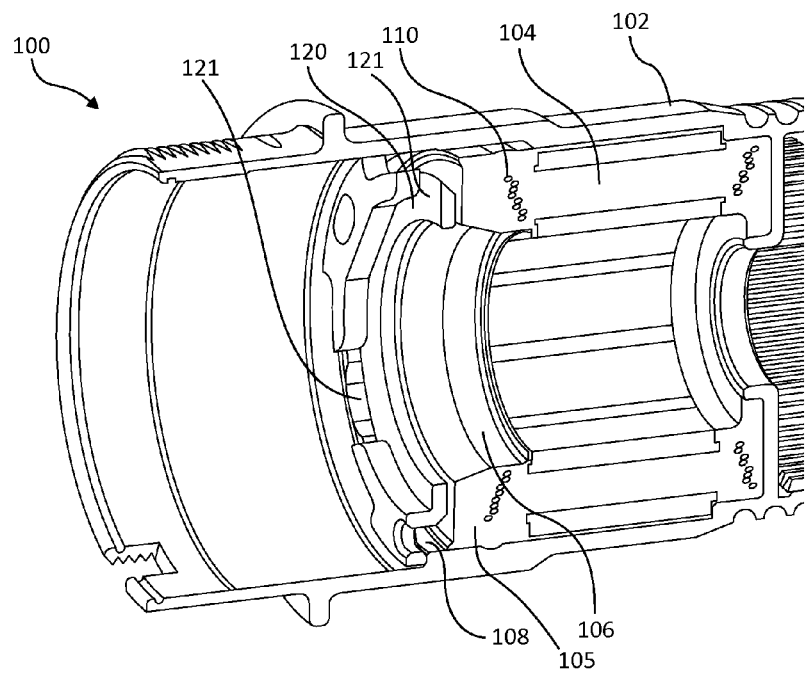
FIG. 2B illustrates a partial cross section of a partially assembled brushless DC motor including a carrier plate, in accordance with various embodiments.

In various embodiments, and with reference to FIGS. 2A and 2B, BLDC motor 100 is shown in a partially assembled state with a carrier plate 120 of a modular position sensor. Carrier plate 120 may rest against overmolding 105 and substantially cover a radial surface of overmolding 105. Carrier plate 120 may be shaped so that motor leads 140 can pass between carrier plate 120 and motor housing 102. Carrier plate 120 may be positioned on overmolding 105 with an HSA in place to allow circumferential positioning of the Hall effect sensors in the desired locations. Once the angular alignment for carrier plate 120 is determined, carrier plate 120 may be fixed in place on overmolding 105. With brief reference to FIG. 3A, HSA 130 and motor shaft assembly 138 may be present while carrier plate 120 is aligned.

In various embodiments, carrier plate 120 may be fixed in place by a fastening mechanism such as glues, epoxies, fasteners, tabs in grooves, or any means that angularly fixes carrier plate 120 relative to stator assembly 104. For example, epoxy may be applied through openings in carrier plate 120 to fix carrier plate 120 in place. Carrier plate 120 may press against shoulder 108 and motor housing 102 to radially locate carrier plate 120 relative to stator assembly 104 and the later installed rotor assembly. In various embodiments, carrier plate 120 may comprise any shape to fixedly hold a later installed HSA in place. For example, carrier plate 120 may comprise locator groove 121 to angularly fix a later installed HSA. Carrier plate 120 may be made from a non-magnetic, rigid material such as a high-temperature thermoplastic (e.g., polyether ether ketone (PEEK) or polyphenylene sulfide (PPS)). In various embodiments, carrier plate 120 may be made from a metal (e.g., aluminum).

Figure 3A:
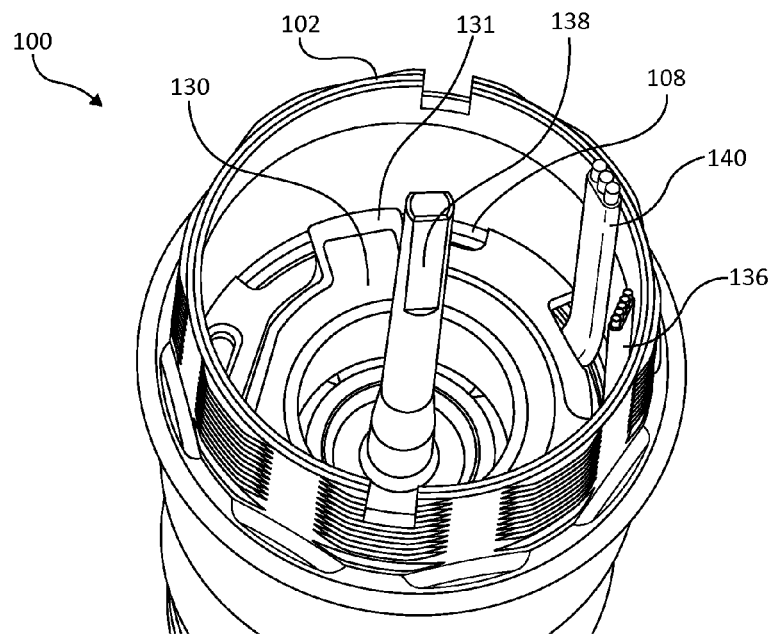
FIG. 3A illustrates a partially assembled brushless DC motor including a Hall effect sensor assembly and a rotor assembly, in accordance with various embodiments.
Figure 3B:
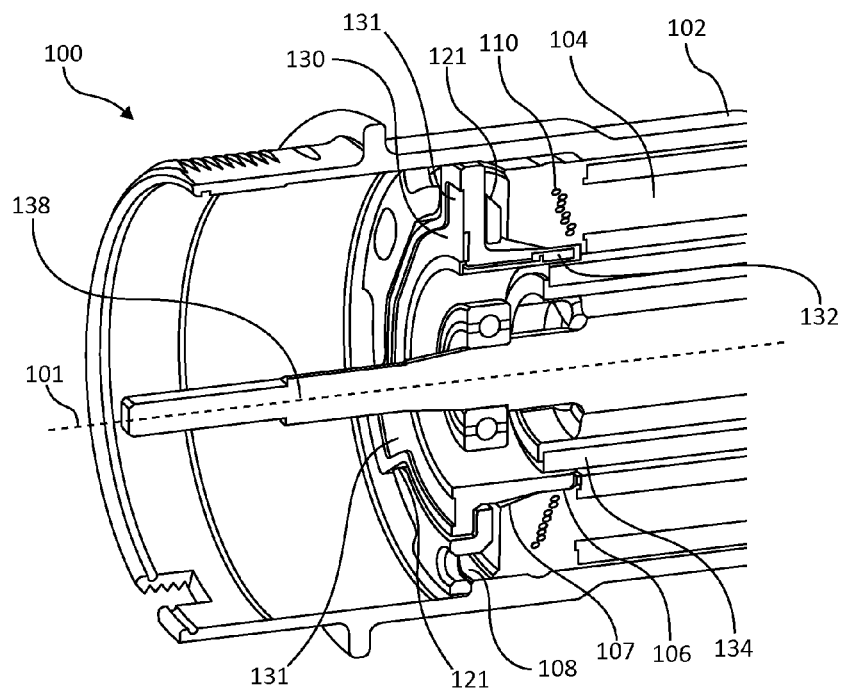
FIG. 3B illustrates a partial cross section of a partially assembled brushless DC motor including a Hall effect sensor assembly and a rotor assembly, in accordance with various embodiments.

In various embodiments, and with reference to FIGS. 3A and 3B, a BLDC motor 100 is shown in a partially assembled state with an HSA 130 and a motor shaft assembly 138. HSA 130 may fit snugly within carrier plate 120. An outer diameter of HSA 130 may press against an inner wall of carrier plate 120. HSA 130 may be removably fixed in place relative to carrier plate 120 using a fastening mechanism such as fasteners, tabs in grooves, holes, pins or any structure that angularly fixes HSA 130 relative to carrier plate 120 and stator assembly 104 and allows HSA 130 to later be removed or replaced. As shown in FIG. 3B, HSA 130 may comprise locator tab 131 that fits into a locator groove 121 of carrier plate 120 to angularly fix HSA 130 relative to carrier plate 120. HSA 130 may be formed with a shape so that HSA 130 only fits into carrier plate 120 in a single angular position. HSA 130 may include three Hall effect sensor modules 132. Hall effect sensor modules 132 may be fully embedded in HSA 130 (e.g., overmolded or potted). The three Hall effect sensor modules may each be positioned 120 degrees away from each other within HSA 130. A portion of HSA 130 containing Hall effect sensor module 132 may extend in an axial direction over tapered surface 107 of radial locating feature 106. Radial locating feature 106 positions Hall effect sensor module 132 in HSA 130 radially to maintain a gap between Hall effect sensor module 132 and trigger magnet 134. In various embodiments, the radial distance between trigger magnet 134 and a Hall effect sensor module 132 may be approximately 0.02 inches (0.5 mm) when the trigger magnet and HSA are radially aligned.

In various embodiments, Hall effect sensor leads 136 may lead away from HSA 130 along the inner wall of motor housing 102 to a controller to facilitate switching of the motor phases. Motor shaft assembly may be centered on axis 101 so that motor shaft assembly 138 rotates around axis 101 during operation. Motor shaft assembly 138 may be fixed to trigger magnet 134 so that trigger magnet 134 rotates with motor shaft assembly 138. HSA 130 may be removed from BLDC motor 100 and replaced by another HSA 130, with Hall effect sensor modules 132 arranged in the same manner internally relative to the shape of HSA 130, without moving carrier plate 120 relative to stator assembly 104. In that regard, HSA 130 is replaceable without associated recalibration of the Hall effect sensor modules 132 as Hall effect sensor modules 132 have the same position relative to HSA 130, and thus the same position relative to carrier plate 120 and stator assembly 104. HSA 130 may be made from a moldable material deposited around Hall effect sensor modules 132 and formed into a shape to mechanically couple HSA 130 to carrier plate 120. In various embodiments, HSA 130 may be made from any non-magnetic material such as a high-temperature thermoplastic (e.g., polyether ether ketone (PEEK) or polyphenylene sulfide (PPS)).

Figure 4A:
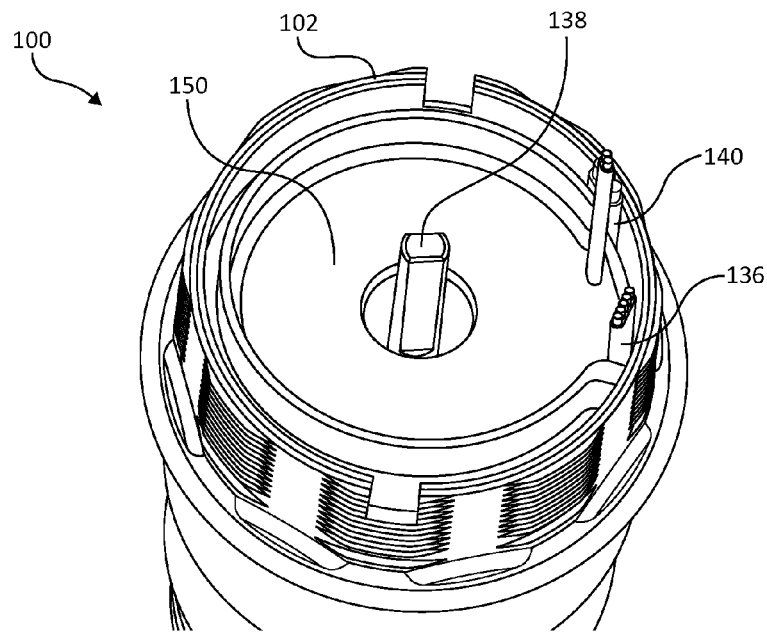
FIG. 4A illustrates an assembled brushless DC motor including an end motor frame assembly, in accordance with various embodiments.
Figure 4B:
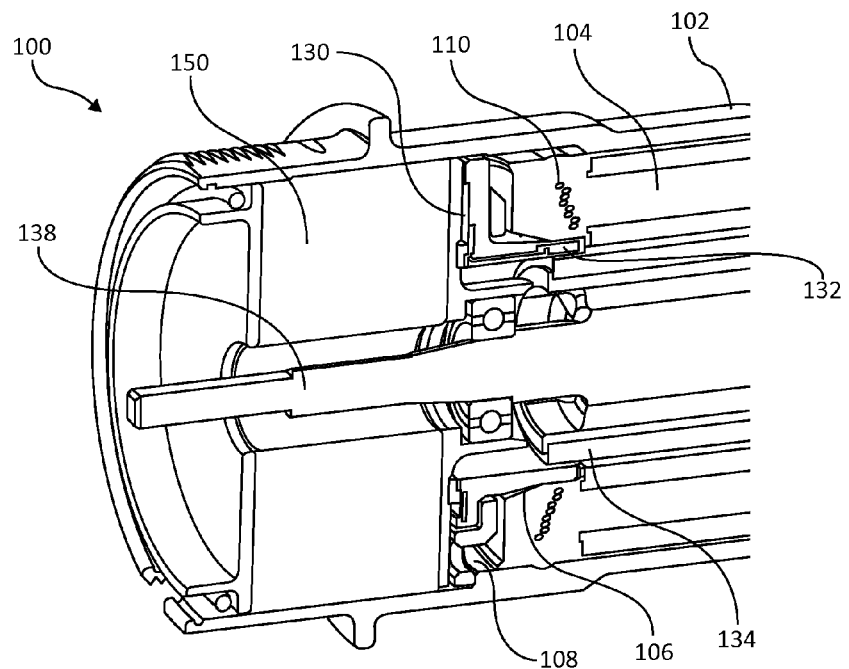
FIG. 4B illustrates a partial cross section of an assembled brushless DC motor including an end motor frame assembly, in accordance with various embodiments.

In various embodiments, and with reference to FIGS. 4A and 4B, a fully assembled BLDC motor 100 is shown. Motor end frame assembly 150 is added at an axial end of BLDC motor 100. Motor end frame assembly 150 may thread into motor housing 102 or otherwise fix axially in motor housing 102. Motor end frame assembly 150 may fix HSA axially against carrier plate 120. HSA 130 may also have a fastener mechanism holding HSA 130 in axially against carrier plate 120. In various embodiments, motor end frame assembly 150 may be an electromagnetic device used to brake the motor. Motor end frame assembly 150 may also serve to fix a motor bearing in place. Compliant material such as silicone foam rubber may be placed between axially locating features of HSA 130 and motor end frame assembly 150. HSA 130 may be replaced by removing motor end frame assembly 150, removing HSA 130, inserting a new HSA 130 into carrier plate 120, and re-installing motor end frame assembly 150.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brushless DC motor, comprising:
    a motor housing disposed around an axis;
    a stator assembly inside the motor housing;
    a carrier plate angularly aligned and permanently fixed relative to the stator assembly by at least one of an epoxy, a resin, or a glue, wherein the carrier plate is fixedly coupled to the motor housing; and
    a Hall effect sensor assembly comprising a disk having an annulus, a cylindrical extrusion about the annulus extending perpendicular to the disk, a first tab, and a first Hall effect sensor,
    wherein the Hall effect sensor assembly is removably coupled to the carrier plate by a structure that fixes the Hall effect assembly relative to the carrier plate, wherein the carrier plate is formed with a shape to angularly locate the Hall effect sensor assembly.

2. The brushless DC motor of claim 1, further comprising a motor end frame assembly configured to axially fix the Hall effect sensor assembly.

3. The brushless DC motor of claim 1, further comprising a second Hall effect sensor and a third hall effect sensor, wherein the first Hall effect sensor, the second Hall effect sensor, and the third Hall effect sensor are located circumferentially about the cylindrical extrusion at a distal end from the disk.

4. The brushless DC motor of claim 1, wherein the motor housing comprises a shoulder configured to axially locate the carrier plate.

5. The brushless DC motor of claim 1, wherein the stator assembly further comprises an overmolding with a tapered surface configured to radially locate the Hall effect sensor assembly.

6. The brushless DC motor of claim 1, wherein the Hall effect sensor assembly further comprises at least one of a flat portion or a second tab to angularly locate the Hall effect sensor assembly relative to the carrier plate, wherein at least one of the first tab or the second tab extends parallel to the disk radially outward of the annulus.

7. The brushless DC motor of claim 6, wherein the carrier plate further comprises a groove configured to receive the tab.

8. The brushless DC motor of claim 1, wherein the Hall effect sensor assembly is removably coupled to the carrier plate by a first fastening mechanism.

9. The brushless DC motor of claim 8, wherein the carrier plate is fixed relative to the stator assembly by a second fastening mechanism.

10. The brushless DC motor of claim 1, further comprising a motor shaft assembly extending through the carrier plate and the Hall effect sensor assembly and configured to rotate about the axis.

11. The brushless DC motor of claim 10, further comprising a trigger magnet fixed relative to the motor shaft assembly.

12. The brushless DC motor of claim 11, wherein the trigger magnet passes within half a millimeter of a Hall effect sensor module coupled to the Hall effect sensor assembly in response to a rotation of the motor shaft assembly.

13. A method of assembling a brushless DC motor, comprising:
    aligning a carrier plate angularly within a motor housing with a first Hall effect sensor assembly in place on the carrier plate, wherein the carrier plate is formed with a shape to angularly locate the first hall effect sensor assembly, wherein the first Hall effect sensor assembly comprises a disk having an annulus, a cylindrical extrusion about the annulus extending perpendicular to the disk, a first tab, and a first Hall effect sensor;

removing the first Hall effect sensor assembly from the carrier plate;

fixing a carrier plate relative to a stator assembly of the brushless DC motor using at least one of an epoxy, a resin, or a glue; and coupling a first Hall effect sensor array to the carrier plate.

14. The method of claim 13, further comprising:

removing the first Hall effect sensor array from the carrier plate; and coupling a second Hall effect sensor array to the carrier plate.

* * * * *